United States Patent [19]

Wood

[11] Patent Number: 4,575,311
[45] Date of Patent: Mar. 11, 1986

[54] GEAR BOX ASSEMBLY-UPPER HEAD ASSEMBLY

[75] Inventor: Charles F. Wood, Mississauga, Canada

[73] Assignee: Indal Technologies Inc., Mississauga, Canada

[21] Appl. No.: 639,824

[22] Filed: Aug. 13, 1984

Related U.S. Application Data

[62] Division of Ser. No. 332,859, Dec. 21, 1981, Pat. No. 4,514,145.

[51] Int. Cl.[4] .................... F03D 7/06; F03D 11/04
[52] U.S. Cl. ..................... 416/170 R; 416/227 A; 416/174; 416/DIG. 6; 384/107
[58] Field of Search .......... 416/170 A, 169 B, 227 A, 416/170 R, 169 R, 227 R, 210 R, 211, 174, DIG. 6; 384/107, 121, 123, 112

[56] References Cited

U.S. PATENT DOCUMENTS

| | | | |
|---|---|---|---|
| 1,198,410 | 9/1916 | Bjornson | 416/DIG. 6 |
| 3,918,839 | 11/1975 | Blackwell et al. | 416/175 A |
| 4,114,959 | 9/1978 | Christ | 384/100 |
| 4,281,965 | 8/1981 | Stjernholm | 416/227 A |

FOREIGN PATENT DOCUMENTS 2504620  10/1982  France .................. 384/107

Primary Examiner—Robert E. Garrett
Assistant Examiner—H. Edward Li
Attorney, Agent, or Firm—Ivor M. Hughes

[57] ABSTRACT

An upper head assembly for the top of a wind turbine comprising a guy wire coupling vertically displaceable by fluid below the coupling.

16 Claims, 22 Drawing Figures

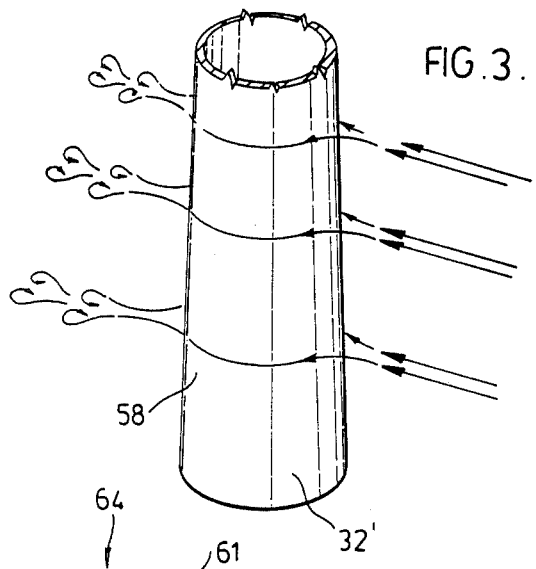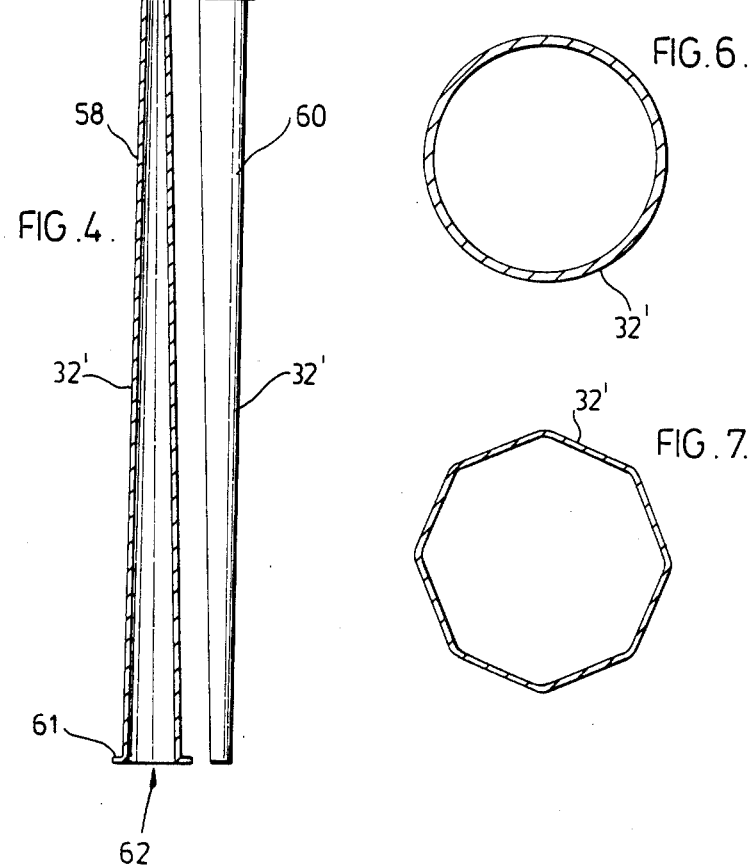

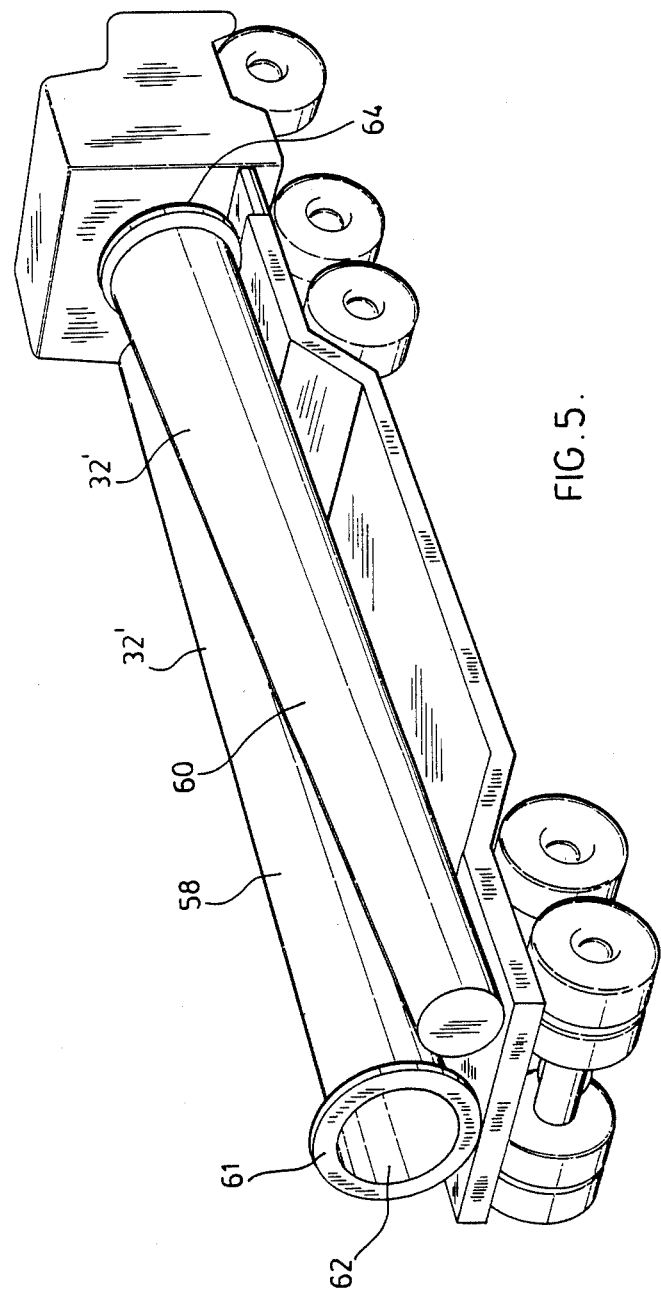

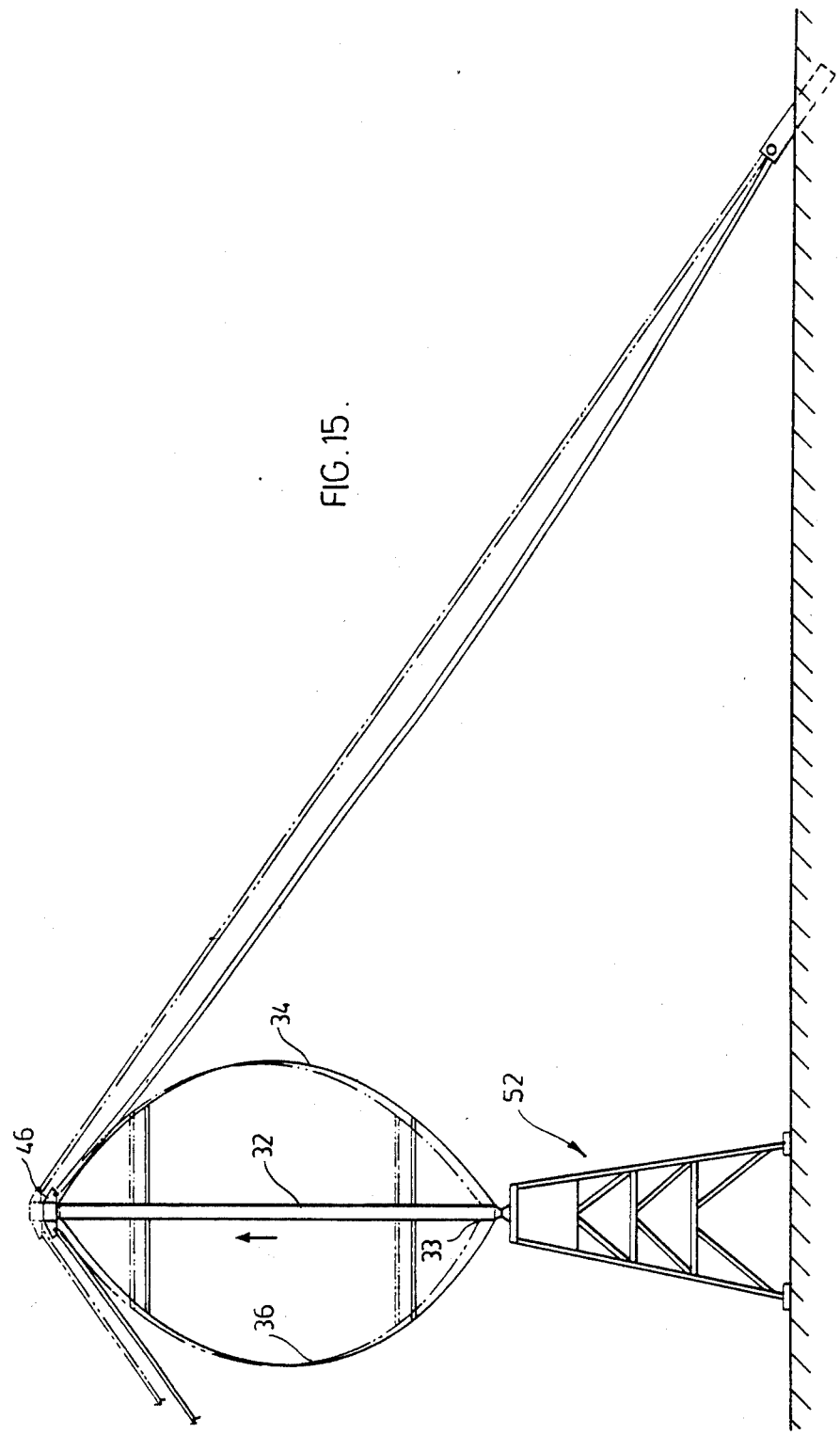

GEAR BOX ASSEMBLY-UPPER HEAD ASSEMBLY

This application is a divisional application of U.S. patent application Ser. No. 332,859, filed the 21st day of December, 1981, now U.S. Pat. No. 4,514,145.

FIELD OF INVENTION

This invention relates to vertical axis wind turbines and components useful therefor, including, hydraulic suspension systems for supporting components of the vertical axis wind turbine, braking systems and an overspeed safety device.

BACKGROUND OF THE INVENTION

In co-pending application Ser. No. 107,933, abandoned. I disclosed an improved gear box assembly for a vertical axis wind turbine, the vertical axis wind turbine having a rotor having a centrally disposed axis oriented in the vertical direction, a bull gear supporting the rotor, a base below the bull gear, the bull gear and base presenting a hollow housing and shaft terminating in an inner end wall and end surface respectively, the housing for receiving the shaft, one of said hollow housing or shaft being stationary and the other being rotatable with respect thereto and secured to the bull gear, the shaft and housing when secured together presenting a space between the inner end wall and end surface, bearings supported between the housing and shaft, a fluid passageway extending into the space created between the inner end wall and end surface for feeding hydraulic fluid under pressure into the space for hydraulically elevating the bull gear relative to the base, means precluding the gear from rising more than a predetermined distance and means draining the fluid from, the space, and reservoir for such fluid.

While the aforesaid structure overcomes problems discussed in the said application, I have discovered a more efficient approach to hydraulically supporting the bull gear, rotor and/or guy wires of vertical axis wind turbines and particularly the bull gear, rotors and guy wires. Particularly, in the description of the embodiment of the invention disclosed in the aforesaid patent application, the rotor is wholly supported by the bull gear. Therefore, when the bull gear is hydraulically lifted and supported, the rotor is also lifted. In the larger wind turbines (for example, wind turbines that generate greater than ⅛ megawatt) the forces exerted between the end of the rotor and seat, and resultant wear and tear of the metal between the rotor and seat, increase dramatically thereby increasing the intervals between maintenance and decreasing the useful life expectancy of the wind turbine.

Additionally, when the rotor of the vertical axis wind turbine is braked as described in the said co-pending application, the guy tensioning ability of the wind turbine ceases.

In the said co-pending application, I also disclosed an emergency safety device for assisting to brake the wind turbine when the angular velocity of the rotor exceeded a predetermined velocity. In this regard, the opening of a normally closed valve leading from the space between the bull gear and shaft (over which the bull gear rotated when elevated by the hydraulic fluid) occurred when the weighted pendulum that rotated with the rotor reached a predetermined extended position—when the angular velocity of the rotor exceeded a predetermined angular velocity. While this approach was an improvement to prior art approaches, its reliability to open at a predetermined angular velocity could not be assured because of for example, friction.

It is therefore an object of this invention, to provide an improved vertical axis wind turbine and components therefor, including hydraulic suspension systems, braking system, and an overspeed safety device wholly reliable in emergency situations, and components therefor, which overcome the aforementioned deficiencies found in prior art structures. These improvements also include an improved hydraulic suspension system for hydraulically supporting the rotor shaft, bull gear and rotor shaft together and in some embodiments maintain the tension of the guy wires of the vertical axis wind turbines even when the bull gear has been braked, and more efficient components for these structures, and a reliable overspeed safety device which operates in emergency situations to effectively shut down the operation of the vertical axis wind turbine.

Further and other objects of the invention will be realized by those skilled in the art from the following summary of the invention and detailed description of the preferred embodiments thereof.

SUMMARY OF THE INVENTION

According to one aspect of the invention, an improved hydraulic suspension system is provided for supporting a rotor shaft of a vertical axis wind turbine, the improvement comprising the rotor shaft having a bottom surface sitting on a spherical bearing surface (preferably an annular spherical bearing surface) supported for angular rotation by the spherical bearing surface, and hydraulic fluid presented to a space below the bottom surface. In one embodiment, the space is created between a support comprising an upstanding continuous wall carrying the spherical bearing surface provided to support the rotor shaft, and the bottom of the rotor. A fluid passageway leading into the space for feeding hydraulic fluid into the space, means for feeding the fluid into the space, sealing means for sealing the space and a reservoir for the fluid are all provided.

Where the rotor is mounted for angular rotation in conjunction with a bull gear, the rotor shaft may be supported by hydraulic fluid in a space between the bottom of the rotor shaft and that part of the bull gear in which the rotor shaft is secured. In this event, the bull gear may be hydraulically supported as shown in co-pending application Ser. No. 107,933 or otherwise.

In this regard, and according to another aspect of the invention, an improved hydraulic suspension system is provided for supporting a rotor and bull gear of a vertical axis wind turbine comprising a base, a gear (a bull gear) adapted to rotate above the base, the bull gear and base presenting a housing and shaft terminating in an inner end one of said housing or shaft being stationary and the other being rotatable with respect thereto and secured to the bull gear and having a centrally disposed circular opening surrounded by a spherical bearing surface (being preferably an annular spherical bearing surface), the rotor being of a diameter at its lower end to seat on the annular spherical bearing surface and close the centrally disposed circular opening, the shaft, rotor and housing when secured together presenting a space between the inner end wall, end surface, and bottom of the rotor, bearing and sealing means between the housing and shaft, a fluid passageway opening into the space between the inner end wall, end surface and bottom of the rotor for feeding hydraulic fluid under pressure into the space for hydraulically elevating the bull gear and rotor, means precluding the bull gear and rotor from rising more than a predetermined or controlled distance, means for feeding the fluid under pressure to, and means for draining fluid from, the space, and a reservoir for such fluid.

Preferably, means precluding the bull gear from rising more than a predetermined or controlled distance comprises the means for draining fluid from the space. In this instance, when the bull gear and rotor are elevated a predetermined distance, a drain is exposed to the space which drains the fluid from the space.

In another aspect of the invention, an improved hyraulic suspension system is provided for supporting a rotor and bull gear of a vertical axis wind turbine, the vertical axis wind turbine comprising a base, a bull gear adapted to rotate above the base, a rotor oriented in the vertical direction coupled to the bull gear to rotate therewith, the base supporting a stationary centrally disposed cylindrical vertical shaft having an upper end, the bull gear having a centrally disposed annular hub of a predetermined inner diameter, the vertical shaft of a slightly lesser outer diameter than the internal diameter of the hub, the annular hub having a top having a circular opening centrally disposed therein surrounded by a spherical bearing surface, (preferably an annular spherical bearing surface) surrounding the circular opening, the rotor being of a diameter at its lower end to sit against the spherical bearing surface and close the opening, bearing and sealing means between the annular hub of the bull gear and stationary shaft, a fluid passageway opening into the space between the upper end of the shaft, top of the hub of the bull gear, and bottom of the rotor, for feeding hydraulic fluid under pressure into the space for hydraulically elevating the bull gear and rotor relative to the base, means precluding the bull gear and rotor rising more than a predetermined or controlled distance ( in one embodiment comprising, the guy wires secured to the guy wire coupling secured to the upper end of the rotor, and/or a drain for draining fluid from the space, the drain being exposed to the space when the bull gear and rotor have been elevated a predetermined distance), means for feeding the fluid under pressure to the space, means for draining fluid from the space, and a reservoir for such fluid.

According to another aspect of the invention, the means for draining fluid may comprise a passageway in the annular hub wall of the bull gear which opens into the space between the hub and shaft after the bull gear and rotor have been raised a predetermined level.

According to another aspect of the invention, brake pads may be interposed between the bottom of the bull gear and base to stop the motion of the bull gear relative to the base when the gear is lowered onto the base.

Therefore, by having both the bull gear and rotor supported by the hydraulic fluid, the load transmitted at the bearing surface between the rotor and bull gear, can be selected for optimal efficiency and depending upon the ratio of area (A) of the opening through the bull gear through which the rotor protrudes into the divided by the cross-sectional area (B) of the space created between the bottom of the rotor, inner end wall and end surface proximate the opening.

In this regard, the total load transmitted ($L_t$) that must be supported $= L_g + W_R + W_B$
where $L_g$ = downward load from the guys
$W_R$ = Weight of Rotor and $W_B$ = Weight of the bull gear.

This load is supported by the hydraulic fluid ($P_o \times B$) where $P_o$ = incoming pressure. Therefore, $P_o B = L_g + W_R + W_B$.

The load that is transmitted at the metal to metal contact between the bull gear and rotor for the purposes herein: $L_m = P_o B - P_o A - W_B$.

Therefore, $L_m = P_o (B-A) - W_B$.

According to another aspect of the invention, the upper end of a wind turbine comprises an upper head assembly for securing the guy wires of the wind turbine thereto, the upper head assembly comprising a guy wire coupling to which the guy wires are secured, a support for supporting the guy wire coupling, the guy wire being vertically, displaceable relative to the support, the guy wire coupling and support presenting a housing and shaft, the shaft for being received in the housing and presenting a space therebetween for receiving fluid therebetween for Yertically displacing the guy wire coupling from the support, a fluid passageway opening into the space, means for supplying fluid through the fluid passageway to elevate the coupling relative to the support, sealing means for sealing the space between the shaft and housing and means to drain the fluid from the space.

While the guy wires themselves limit the vertical displacement of the shaft relative to the housing, a drain may also be provided which is exposed to the space to drain the space when the shaft is displaced more than a given amount from the housing.

According to another aspect of the invention, the upper end of a rotor of a wind turbine may include a fluid passageway opening proximate the upper end of the rotor into a space between the rotor and a guy wire coupling (preferably opening through the top surface of the rotor into a head to which the guy wires may be secured or a guy wire coupling seated over the upper end of the rotor), means for supplying fluid through the fluid passageway to elevate the coupling relative to the rotor end, sealing means preferably between the coupling and the upper end of the rotor, and means to drain the fluid from the space.

According to another aspect of the invention, an upper head assembly for securing to the top of a rotor shaft of a vertical axis wind turbine is provided for securing the guy wires thereto, the upper head assembly and rotor shaft presenting a housing and shaft terminating in an end wall and end surface respectively, the housing for receiving the shaft, one of said housing or shaft secured to the upper end of the rotor shaft and the other for securing to guy wires, the housing and shaft being vertically displaceable with respect to one another by fluid being fed into a space between the end wall and end surface, a fluid passageway opening into the space through which fluid is fed into the space, means for precluding the guy wire coupling rising more than a predetermined or controlled distance, means for feeding the fluid under pressure to elevate the member secured to the guy wires and means for draining the fluid to lower the last member, and a reservoir for such fluid.

Preferably, the fluid passageway of the upper head assembly is connected to the space created by, the end wall, end surface and bottom of the rotor of the vertical axis wind turbine to which space hydraulic fluid is fed for hydraulically supporting the bull gear and rotor. In this regard, according to another aspect of the invention, the fluid passage may lead from the space between bull gear, rotor and top of the shaft, to open into the space created in the upper head assembly and the fluid passageway may include a pressure-regulating valve and one-way check valve between the pressure-regulating valve and top of the wind turbine to preclude fluid transmitted to the upper end of the rotor from returning via said passageway when fluid is drained from the space created between the shaft, hub and rotor.

According to another aspect of the invention, a hydraulic damper may be provided between the check valve and upper head assembly the hydraulic damper for dissipating energy in the system.

According to another aspect of the invention, the hydraulic damper may comprise a restriction in a conduit.

According to another aspect of the invention, the hydraulic damper may include a restriction and a hydraulic accumulator connected in parallel to the restriction for dissipating energy.

As in the earlier application, brake pads can be interposed between the base (above which the bull gear will rotate), and bull gear, for braking the bull gear as the bull gear is lowered by the drainage of fluid from the space. In an emergency situation, when the angular velocity of the rotor exceeds a predetermined angular velocity, an overspeed safety device can be provided, secured to the rotor, to cause the rapid drainage of the fluid from the space between the bottom of the rotor, inner end wall and end surface lowering the bull gear onto the brake pads, the overspeed safety device comprising a passageway leading from the space containing the fluid between the inner end wall, end surface, and bottom of the rotor for permitting the fluid to leave the space via the passageway when the angular velocity of the rotor exceeds a predetermined angular velocity, means closing the passageway comprising a pivotal arm, preferably including means on the end of arm for closing the passageway, the last means preferably pivotable with respect to the arm, the pivotal arm pivotable about a pivot point on the end of the arm remote the means closing the passageway in a direction away from the rotor from a position closing the passageway to a position opening the passageway, a housing or tube secured to and spaced from the pivotable arm to pivot therewith in a direction away from the rotor when the passageway is opened, the housing or tube being angled radially away from the rotor from the bottom of the tube or housing to the top and containing a rolling element or fluid capable of moving along the housing or tube as the case may be, from the bottom towards the top when the rotor exceeds a given predetermined angular velocity, thus causing the center of gravity of the housing or tube to move towards the top of the tube or housing to cause the tube or housing to pivot the pivotable arm thus opening the passageway, draining the fluid from the passageway. In use, the overspeed device is enclosed to catch the fluid and a drain is provided to drain fluid collected for reuse.

Preferably, the housing contains a rolling element (either a cylinder or sphere) for rolling up the length of a wall surface of the housing or tube when the predetermined angular velocity is reached.

Preferably the housing or tube is square in cross-section.

When the wind turbine is operating normally with the passageway closed by the pivotal arm ( when the angular velocity of the rotor does not exceed a predetermined angular velocity) a resultant force is exerted on the fluid or rolling element made up of a gravitational force and a centrifugal force directed away from the rotor of the wind turbine. When the angular velocity of the rotor is small, the resultant force holds the fluid or element on the bottom of the tube maintaining the pivotal arm in a position closing the passageway. In the case of the rolling element (which is more precise) as the angular velocity of the rotor increases, the centrifugal force increases tending to urge the element to roll up the inclined surface of the housing surface away from the rotor. However, the resultant force is not sufficient to cause the element to roll up the incline of the housing until the rotor reaches a predetermined angular velocity. At this point, the resultant force made up of the gravitational force and centrifugal force is directed above the center of rotation of the rolling element (when looking from the bottom of the tube or housing) causing the rolling element to roll up the surface of the housing on which it lies to the upper end of the housing. (A similar result is arrived at though less precisely, using a fluid). At that point, the force exerted by the element (or fluid) is sufficient to cause the housing to pivot causing the pivotal arm to pivot about the pivot point opening the passageway, releasing the fluid.

Preferably, the rolling element sits on a hard steel plate in the housing to preclude the wearing away of the surface where it would normally seat precluding the creating of a rut in which the rolling element could become lodged.

Therefore, the normally closed passageway is centrifugally opened by the overspeed safety device when the rotor exceeds a predetermined angular velocity. Activation is not dependent on weather conditions but only on the setting. Because there is little to wear out in the construction of the device, the safety device has a long, useful life and provides substantially 100% reliability.

Furthermore, because of its structure, it will not trip prematurely. Particularly, in a preferred embodiment employing a rolling element, nothing can happen to move the rolling element up the angled incline until the predetermined velocity is reached. Only then will it roll up the incline to the top end of the housing creating a large enough clockwise movement about the center of rotation causing the housing to pivot, thus pivoting the arm opening the passageway. The enclosure then collects the discharged fluid and directs it for reuse.

Of broader scope, this invention also provides an overspeed safety device for ensuring the operational safety of a body rotating about in a vertically oriented axis which body for safety reasons should not exceed a predetermined angular velocity, the safety device comprising a housing or tube pivotable about a pivot point proximate a lower end of the tube, or housing, radially away from the center of the rotating body, the housing or the tube having a surface inclined radially upwardly away from the rotating body from the bottom to the top to support a rolling element or fluid thereon, which element or fluid moves radially to the upper end of the tube or housing, when the rotating body exceeds a predetermined angular velocity causing the tube to pivot about the pivot point, and means preferably connected to the tube activated by the pivoting of the tube to operate in a predetermined manner, as for example, a valve opened by the pivoting of the tube.

According to another aspect of the invention, the rotor shaft is preferably tapered at the ends from a broader central portion. While any cross-sectional shape of the rotor shaft is satisfactory (symmetrically octagonal for example), it is preferable that the rotor shaft be circular in cross-section. For ease of manufacture, it is preferable the rotor shaft be manufactured in two or more sections. Where two sections are employed, each section preferably comprises a broader end tapering to a narrower end. Annular flanges may extend radially or laterally of the section, from the broader end of each section for use in joining the sections together.

The advantage of this configuration is that the wind loading under storm conditions is less. Additionally, because the rotor shaft of a vertical axis wind turbine can create aerodynamic interference with the blade passing behind the rotor shaft with respect to the wind direction, the use of the tapered shaft produces only a series of variable frequency vortices which provide less interference to the performance of the blade passing in the shadow of the rotor shaft than the vortices created by the constant diameter rotor. A further advantage is the cost of shipping—the ability to carry two or more sections of the rotor by truck with the tapered end of one section next to the broader end of another section.

BRIEF DESCRIPTION OF THE DRAWINGS

The invention will now be illustrated with reference to the following drawings of preferred embodiments of the invention, in which:

FIG. 3 is a close-up schematic view of part of the structure of FIG. 2.

FIG. 4 is a partly sectioned view of disassembled components shown assembled in FIG. 2.

FIG. 5 is a perspective view of the components in FIG. 4 being transported.

FIGS. 6 and 7 (shown with FIG. 4) illustrate cross-sections of two different rotor sections according to embodiments of the invention.

FIG. 15 illustrates the tensioning of the guy wires of a vertical axis wind turbine.

DETAILED DESCRIPTION OF THE EMBODIMENTS OF THE INVENTION

Figure 1:
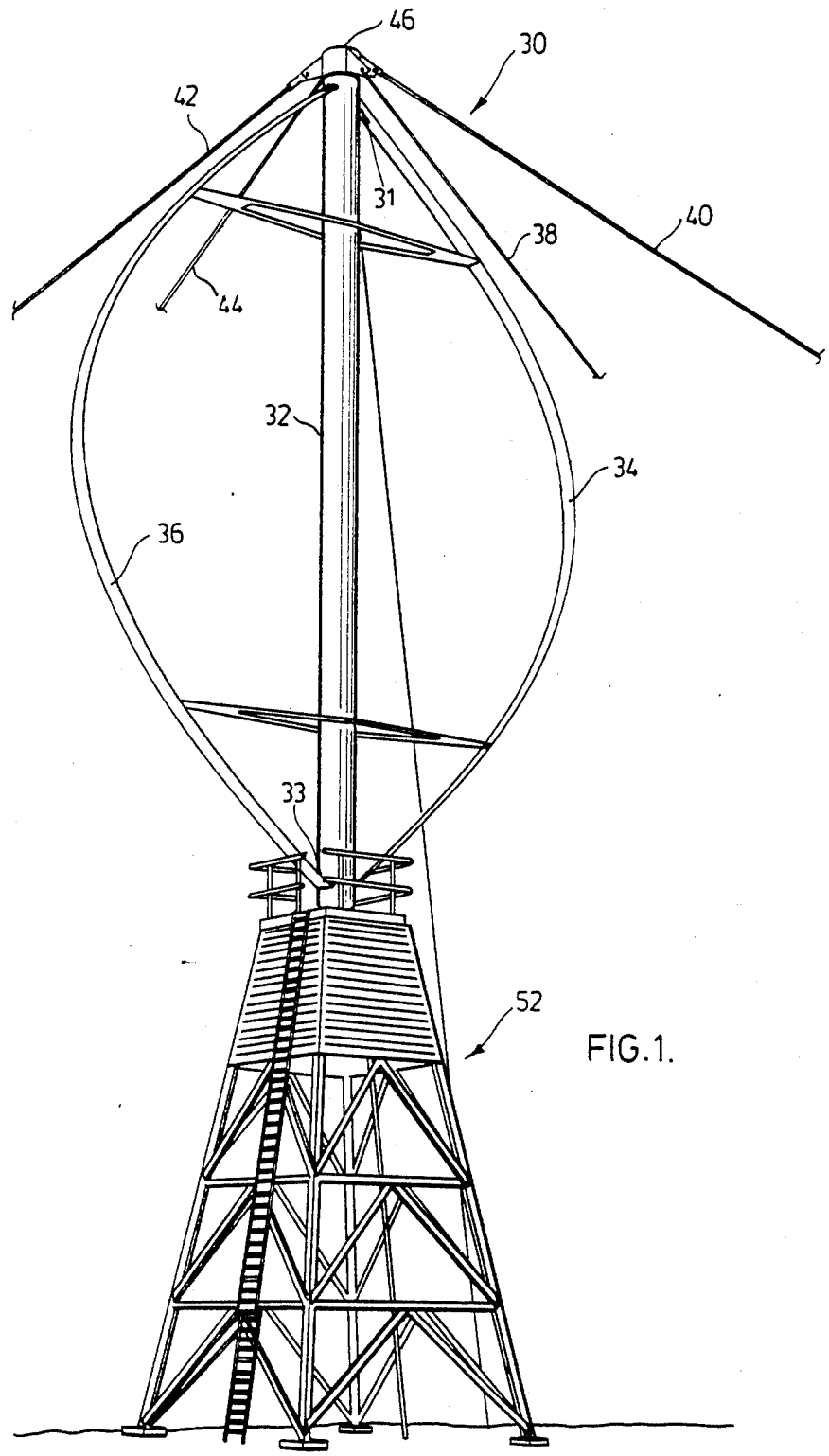
FIG. 1 is a perspective view of a Darrieus vertical axis wind turbine incorporating preferred embodiments of the invention.

With reference to FIG. 1, Darrieus vertical axis wind turbine 30 comprises vertical rotor shaft 32 and rotor blades 34 and 36 spaced from and secured to shaft 32, by connectors at 31 and 33. Four (4) guy wires shown as 38, 40, 42 and 44 are connected to, and support, wind turbine 30, through upper head assembly 46. The lower end of shaft 32 is secured for rotation in gear box assembly 50 (See FIGS. 8, 9, and 11) mounted in tower 52.

Figure 2:
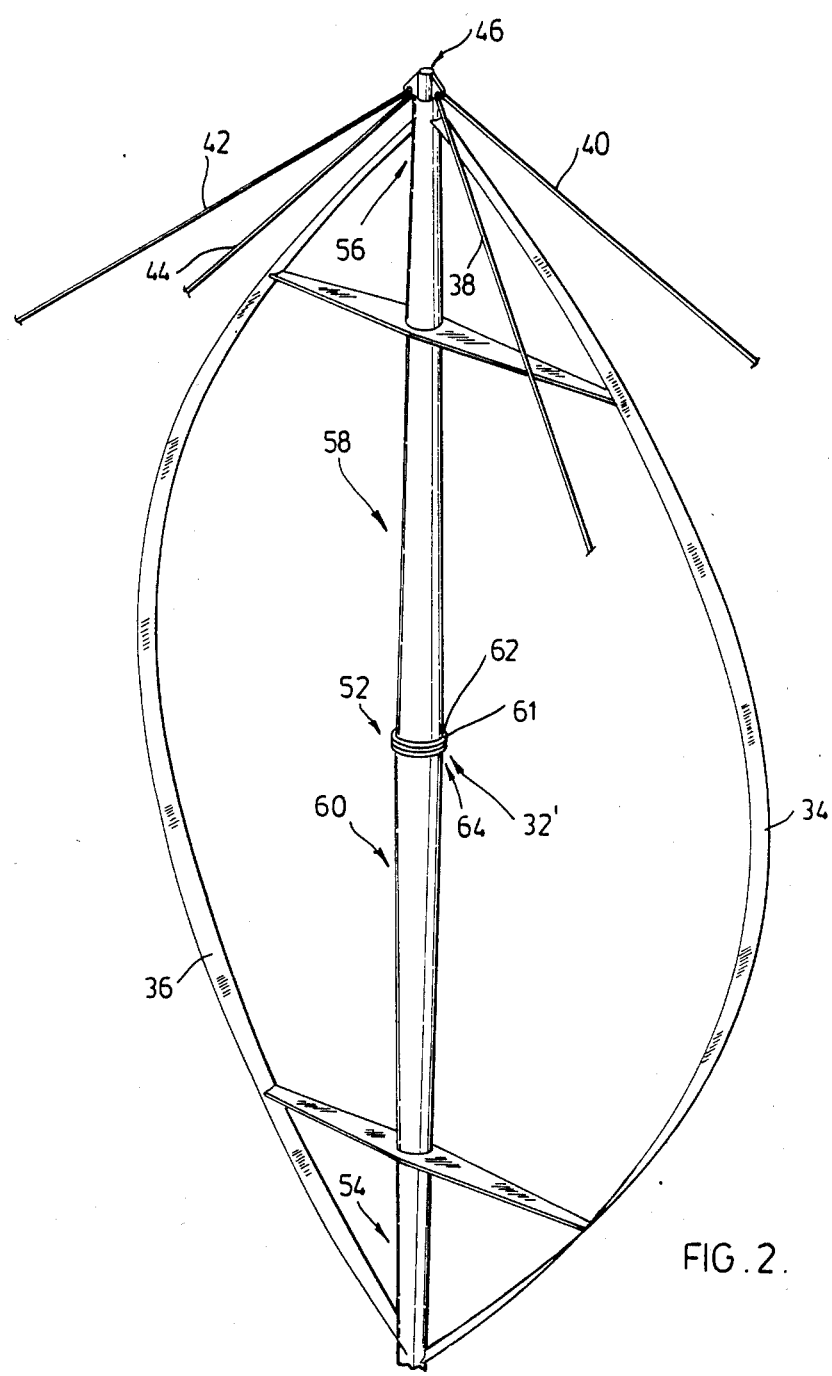
FIG. 2 is a close-up perspective view of part of a rotor of a Darrieus vertical axis wind turbine according to another embodiment of the invention.

With reference to FIG. 2, rotor shaft 32 has been replaced by shaft $32^1$ tapered from a broader central portion at 52 to reduced end portions at 54 and 56. Shaft $32^1$ is made up of two tapered sections 58 and 60 (see also FIG. 4) having angular flanges 61 extending radially from the sections at the broader ends 62 and 64 respectively for connecting the sections. Curved blades 34 and 36 are connected to shaft $32^1$ proximate the ends in the same manner as in FIG. 1.

FIGS. 6 and 7 illustrate two cross-sections that shaft $32^1$ may take. The circular cross-section shown in FIG. 6 is preferred to the octagonal cross-section shown in FIG. 7.

Shaft $32^1$ is preferred to shaft 32 in the construction of Darrieus vertical axis wind turbine 30. This is because constant diameter shaft 32 creates aerodynamic interference with each of the rotor blades 34 and 36 as each passes behind the rotor with respect to wind direction, reducing the efficiency of the rotor. The reason is the cumulative effect of the Von Karman vortex generation—The Von Karman vortex generation caused by the rotor shaft in the windstream is a function of shaft diameter. Since the diameter of the shaft 32 is constant, the frequency of the Von Karman vortices generated along the length of shaft 32 is constant, the vortices reinforce one another. The use of tapered shaft $32^1$ tapering from a broader central portion to narrower ends produces a series of independent variable frequency vortices which are less disruptive to the performance of the blades passing in the "shadow" of the column.

FIG. 3 illustrates schematically the independent variable frequency vortices produced in the shadow of shaft $32^1$.

An additional benefit results from the use of two tapered sections 58 and 60 connected to form shaft $32^1$. By producing tapered shaft $32^1$ in two sections, they may be shipped as shown in FIGS. 4 and 5. Particularly, highway regulations, regulate the maximum width of a vehicle and its capacity to carry oversized structures of large diameter. Where the load is oversized, special permits and/or a police escort are required. Because the diameter of large constant diameter rotors in excess of 120 feet is about 5', it is not ordinarily possible to ship the rotor in two sections loaded on one truck side by side. However, because the diameter of the section 58 and 60 taper from 5' to narrower 2' end portions, the sections may be shipped side by side as shown in FIG. 5.

Figure 8:
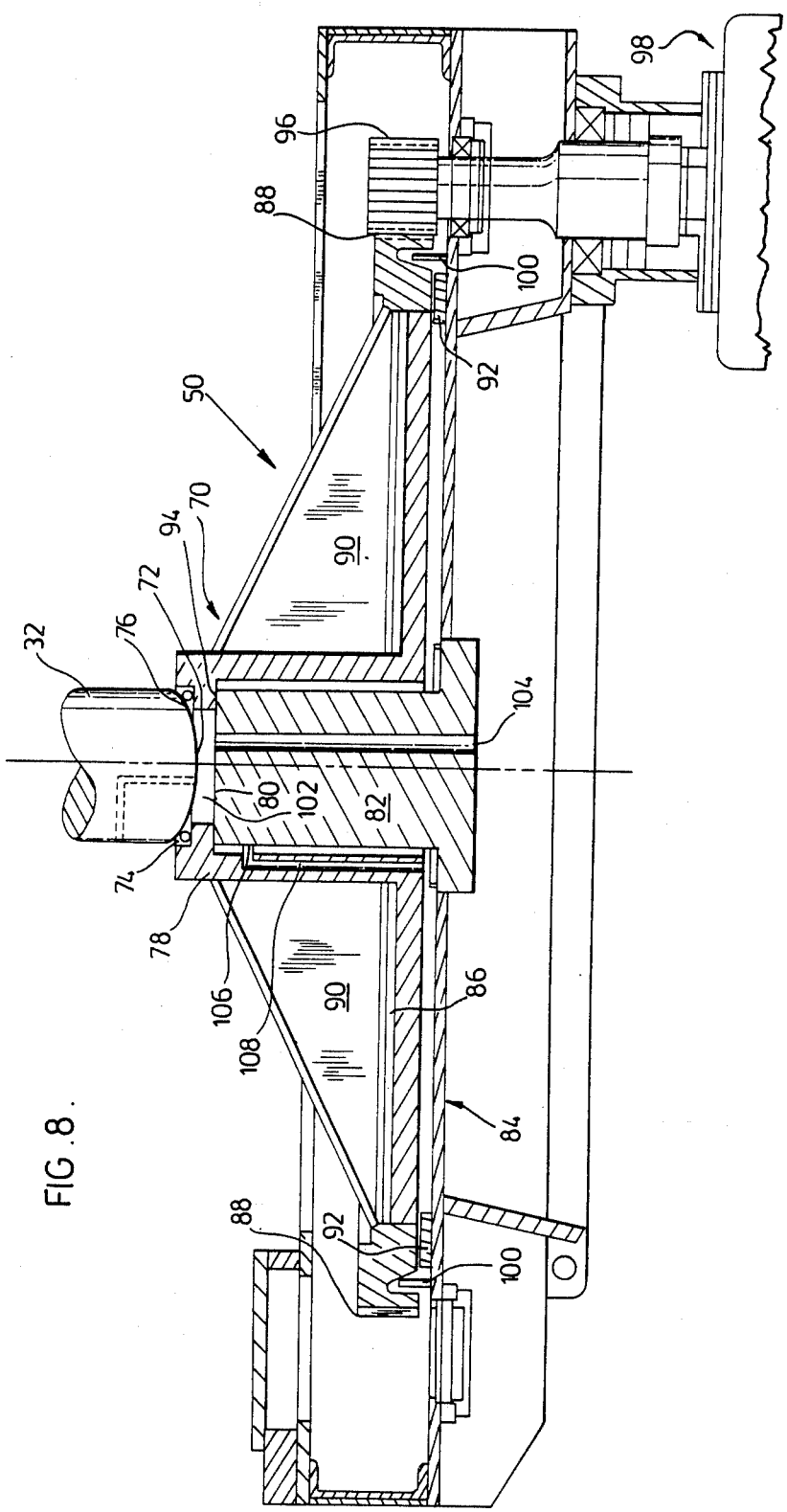
FIG. 8 is a side view of part of a gear box assembly according to a preferred embodiment of the invention, partly in section with component parts cut away.
Figure 9:
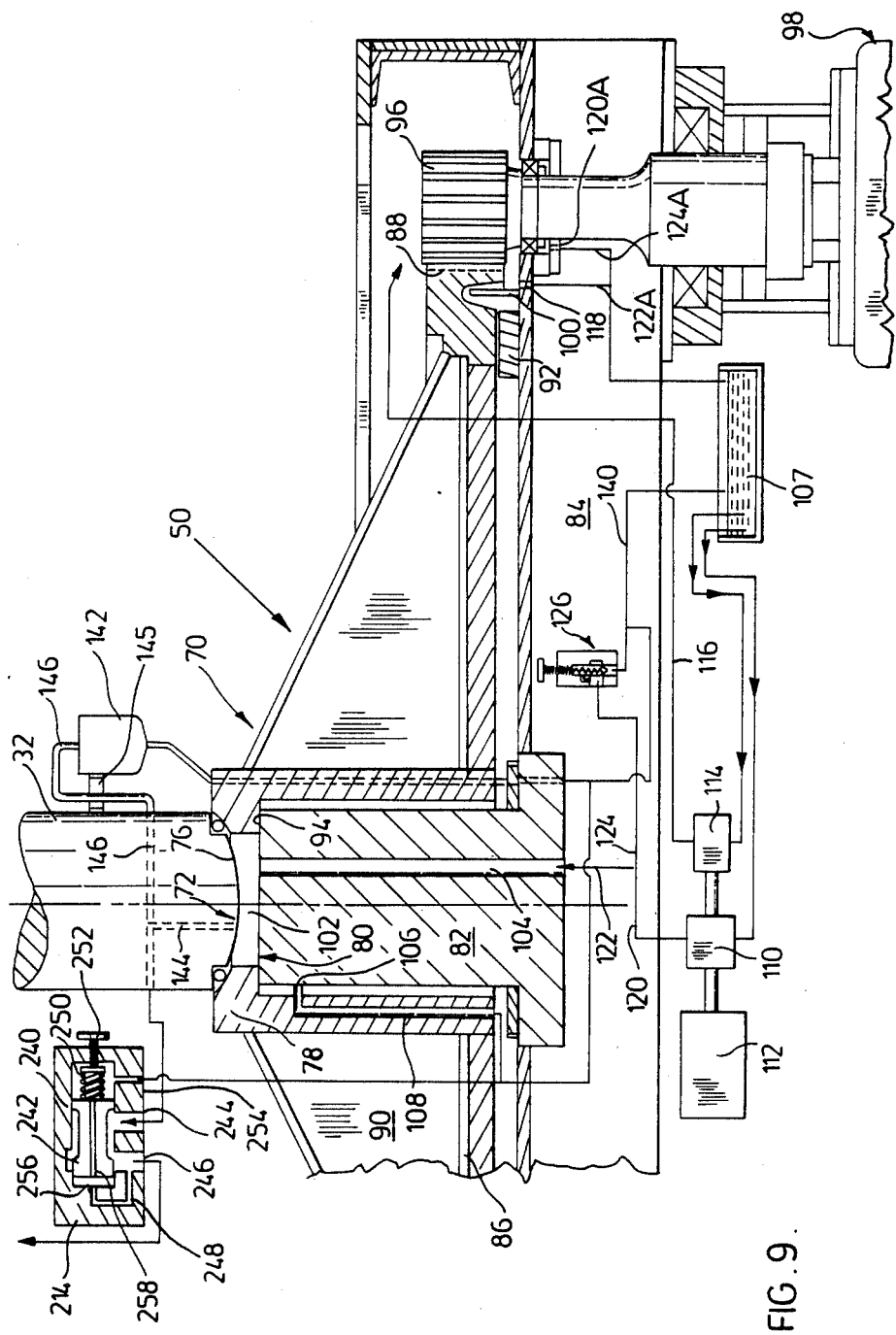
FIG. 9 is a close-up schematic view of part of the gear box assembly according to a preferred embodiment of the invention.
Figure 11:
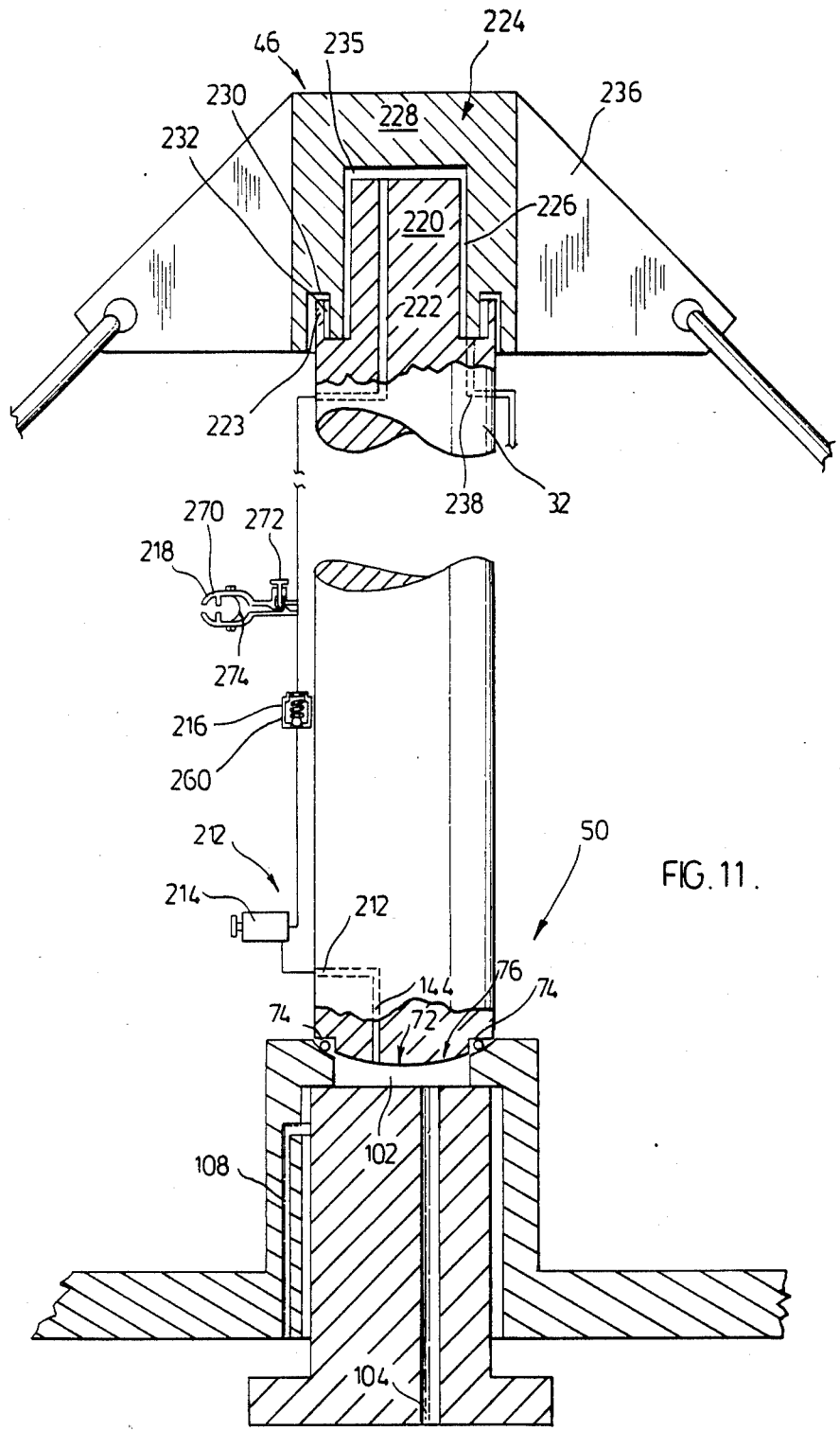
FIG. 11 is a side schematic view of part of an assembly according to a preferred embodiment of the invention.

With reference to FIGS. 8, 9 and 11, gear box assembly 50 is shown, incorporating a hydraulic suspension system for supporting rotor shaft 32 or 32¹ (for simplifying description, rotor shaft 32 has been used) and bull gear 70 for rotation, and, for tensioning and supporting guy wires 38, 40, 42, and 44, under a constant tension whether or not the bull gear and rotor are operational.

Particularly, bull gear 70 has circular opening 72 at the top thereof surrounded by annular spherical bearing surface 74 for supporting the bottom surface 76 of shaft 32 proximate its radially outer bottom edge, shaft 32 seats in opening 72 on spherical bearing surface 74 as shown.

Bull gear 70 comprises (a) central hub 78 overlying end 80 of stationary shaft 82 (of lesser diameter than hub 78), shaft 82 being secured to base 84 above which bull gear 70 will rotate (b) bottom plate 86 secured to hub 78, (c) gear ring 88 secured to the periphery of bottom plate 86 and (d) triangular stiffening webs 90 secured between plates 86 and hub 78.

Base 84 supports brake pads 92 proximate the periphery of plate 86 for seating on brake pads 92 when Darrieus vertical axis wind turbine is not operational. When plate 86 seats on brake pads 92, end surface 80 of shaft 82 is either spaced from the inner end of hub 78 or in contact with it. Hydrodynamic bearings (not shown) are secured between the inner side wall of hub 78 and the outer side surface of vertical shaft 82 for sealing the space created between the end 80 of shaft 82, inner end wall of hub 78 and the bottom surface 76 of rotor shaft 32 when bull gear 70 is raised relative to shaft 82.

Hub 78 and rotor shaft 32 are free to rise with respect to shaft 82 ultimately limited by guy wire reaction and the hydraulic fluid permitted to enter space 102 between the shaft, hub and rotor, to support the hub and rotor as described herein. Bull gear 70 meshes with pinion gear 96 coupled to generator 98 for driving generator 98. Annular dam wall 100 sits on base 84 and separates the interior space under gear 70 from generator 98 and the remainder of equipment (not shown).

Hub 78 and rotor shaft 32 are hydraulically supported with respect to stationary shaft 82 by hydraulic fluid fed into the space 102 created between the bottom surface 76 of rotor shaft 32, inner end 94, and end surface 80, as bull gear 70 and rotor 32 are elevated by fluid fed into space 102 from passageway 104 fed from reservoir 107 by hydraulic circuitry shown schematically in FIG. 9. With reference to FIG. 9, hydraulic fluid is fed into space 102 from reservoir 107 through passageway 104 by pump 110 operated by electric motor 112. Pump 114 operated on a common axis as pump 110 by motor 112 pumps fluid through passageway 116 to lubricate the gear/pinion mesh. Fluid passing down from the lubrication of the gear 88/pinion 96 mesh is collected through passageways 118 and 120A by returns 122A and 124A.

Fluid is normally drained from space 102 by outlet port 106 (of the same dimensions as passageway 104) through drain passageway 108 in hub 78 and returned to the reservoir 107 when bull gear 70 is elevated a predetermined distance above stationary shaft 82 exposing outlet port 106 to space 102. Therefore, gear 70 and rotor 32 cannot be elevated more than a predetermined distance because the feeding of hydraulic fluid into space 102 is maintained at a flow rate not to exceed the flow rate draining fluid through port 106 for return to reservoir 107.

Figure 10:
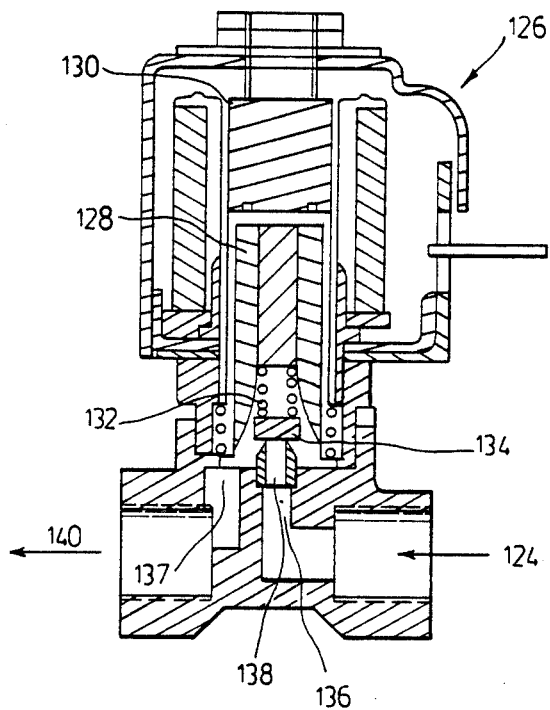
FIG. 10 is a detailed schematic side view of a valve shown diagrammatically in FIG. 5.

When bull gear 70 and rotor shaft 32 are to be lifted hydraulically, fluid is pumped from reservoir 107 under pressure by pump 110 through passageway 120, 122 and 104 into space 102 elevating both gear 70 and rotor 32 enlarging space 102 comprising the volume between inner end wall 94 of hub 78, the bottom surface 76 of rotor shaft 32 and 32. At the same time, fluid attempts to move through passageway 124 through valve 126. However, valve 126—electrically operated two way direct-pilot-operated valve (manufactured by Sperry Vickers) shown in cross-section in FIG. 10—is normally closed and opens only upon electrical failure to the Darrieus vertical axis wind turbine 30. To this end, with reference to FIG. 10, valve 126 is electrically powered to normally repel magnetic movable core 128 from stationary core 130 so long as electrically connected to a power source compressing spring 132 of spring loaded sealing disc 134 to seal port 136 by stainless steel seat 138. When the electric power is shut off in, for example, an electrical power failure to the wind turbine, the force of spring 132 forces core 128 away from sealing disc 134 releasing seat 138 opening communication between the two ports 136 and 137 draining all fluid from space 102 through passageway 104 and outlet 140 to reservoir 107.

In cases where the angular velocity of the rotor exceeds the prescribed maximum safe angular velocity, overspeed safety device 142 and associated components come into play. With reference to FIGS. 9 and 16 to 21 inclusive, device 142 and associated components including passageway 144, leading from space 102 in rotor shaft 132 through branched portion 146 to device 142 are shown. Device 142 is secured by support bracket 145 to rotor 32 to rotate therewith, and is enclosed by housing 150 made up of reservoir 152 (See FIG. 16) and weighted closure 154. Oil return and hold down pipe 156 extends upwardly through the bottom 158 of reservoir 152 and is releasably secured to top 154 by threaded bolt 160 secured into threaded end of pipe 156. Washer 163 compressingly seals the opening in top 154 through which bolt 160 extends and gasket 164 is positioned between top 154 and the top of continuous wall 166 of reservoir 152 to seal the space in housing 150 against leakage between the reservoir 152 and top 154.

Pipe 156 has been notched at 162 to permit oil to drain from reservoir 152 to the sump (oil reservoir) 107.

Figure 17:
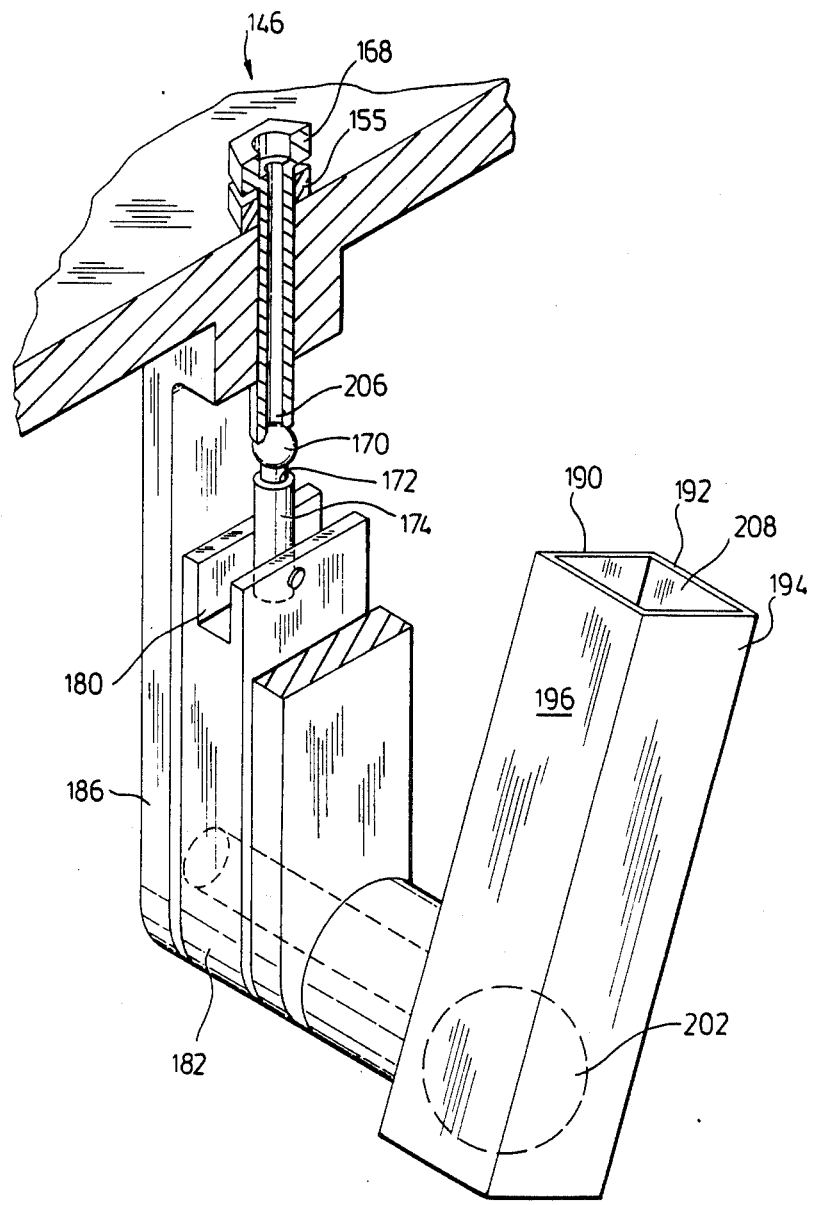
FIG. 17 is a perspective view partly in section of the assembly shown in part in FIG. 16.
Figure 18:
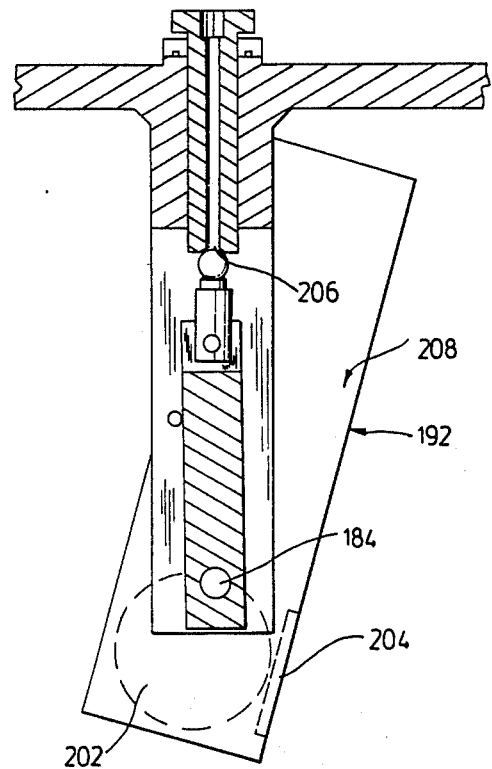
FIGS. 18 and 19 illustrate schematically the operation of the assembly in FIG. 17.
Figure 19:
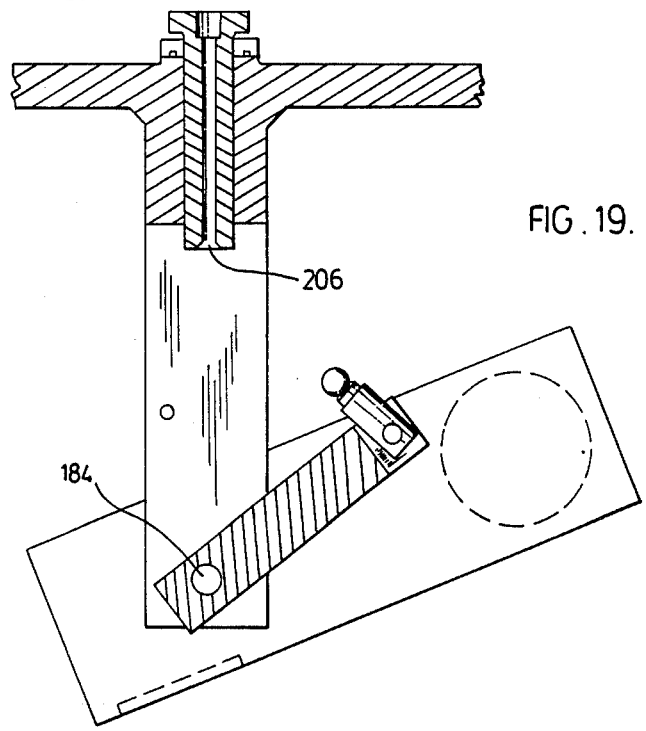
Figure 20:
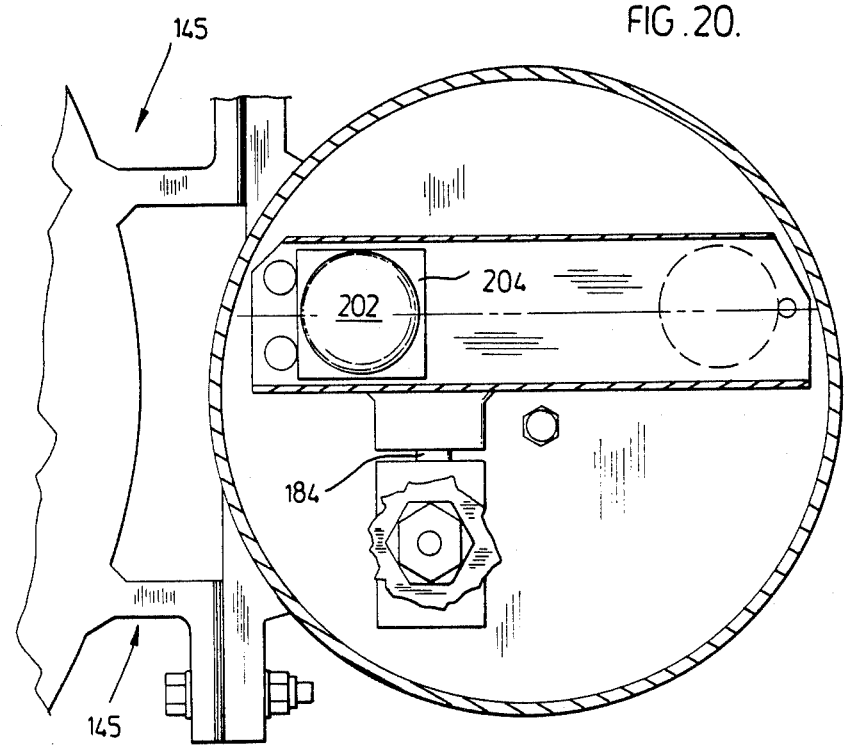
FIG. 20 is a top view of the assembly of FIG. 16.

Oil inlet 146 is secured to metal tube 168 passing through top 154 (See FIG. 17) sealed by washer 155 and is closed by ball valve 170 supported on arm 172 to urge ball 170 to close tube 168 as shown in FIG. 17. Arm 172 is in turn supported in pivotable upper valve lever arm 174 laterally pivotable in channel 180 of lower valve lever arm 182 with respect to arm 182. Channel 180 extends radially from rotor 32. Lower lever arm 182 is fixedly secured to rotatable shaft 184 (See FIG. 20) passing therethrough to rotate therewith radially away from rotor shaft 32 from the position shown in FIG. 17. Shaft 184 is fixed for rotation in support 186 secured to top 154. Shaft 184 is in turn fixed to hollow square tubing 188 comprising elongated rectangular walls 190, 192, 194 and 196 so that when tubing 188 rotates, shaft 184, and arm 182 all rotate together away from the rotor shaft 32.

Stop bolts 198 and 200 are secured across the center of the open ends of tubing 188 for stopping metal ball 202 from passing through the ends. Plate 204 (See FIGS. 18 and 21) is positioned on the inside surface of wall 192 proximate bolt 190. Tube 188 is secured to shaft 184 at an angle of 75 degrees to the vertical when ball valve 170 closes the opening 206 of inlet 168 sloping upwardly and radially outwardly from rotor shaft 32 (looking from the bottom of tubing 188) to provide radially upwardly angled ramp 208 on the inside surface of wall 192.

Figure 21:
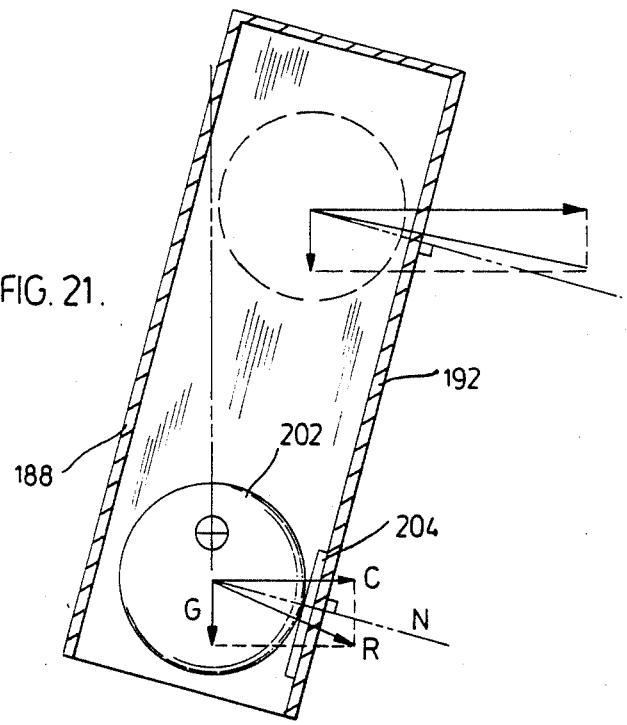
FIG. 21 is a schematic illustrating the forces on component parts of part of the assembly of FIG. 17 in various positions.

With reference to FIG. 21, as the rotor rotates at a safe angular velocity, less than a predetermined given unsafe angular velocity, two forces are exerted on ball 202, gravity (G) and a centrifugal force (C) radially outwardly. The resultant (R) of the two forces does not cause the ball to move. However, as the angular velocity of the rotor increases, the Resultant (R) approaches a position normal (N) to the plate until at the predetermined angular velocity, the resultant (R) passes the normal (N) exerting a clockwise movement about the center of gravity on sphere 202 causing sphere 202 to roll up ramp 208 altering the center of gravity of tubing 188, causing tubin9 188 to rotate radially away from rotor shaft 32 on shaft 184 rotating shaft 184 and arm 182 thus opening inlet 168 (See FIG. 17) permitting fluid in space 102 to drain through outlet 162, through passageway 156 to reservoir 107, causing bull gear 70 to settle on brake pads 92 stopping rotor 32 and bull gear 70.

With reference to FIGS. 9 and 11 to 15 inclusive, fluid fed through passageway 144 from space 102 normally passes through passageway 212 past pressure-regulating Valve 214, check valve 216 and hydraulic damper 218 in passageway 212.

With reference to FIG. 11, upper head assembly 46 includes a shaft 220 secured to the top of rotor shaft 32 of lesser diameter than shaft 32 having passageway 222 passing therethrough in communication with passageway 212 and annular dam wall 223 surrounding shaft 220 spaced therefrom. Head 224 seats over shaft 220 and comprises annular wall 226, top 228 and downwardly opening annular endless channel 230 in wall 226 to accommodate dam wall 223. Annular seals 232 are positioned between dam wall 223 and annular channel wall 234 closest shaft 220 to seal a space between head 224 and shaft 220. Hydrodynamic bearings 235 are secured between the inner surface of wall 226 and outer surface of shaft 220 for sealing the space created between the end of shaft 220 and the inner surface of top 228. Four triangular webs 236 extend from head 224 and secure guy wires 38, 40, 42 and 44 thereto.

Drain 238 drains fluid from controlled bearing leakage past hydrodynamic bearings 235 from the space between seals 232 and hydrodynamic bearings 235.

Figure 12:
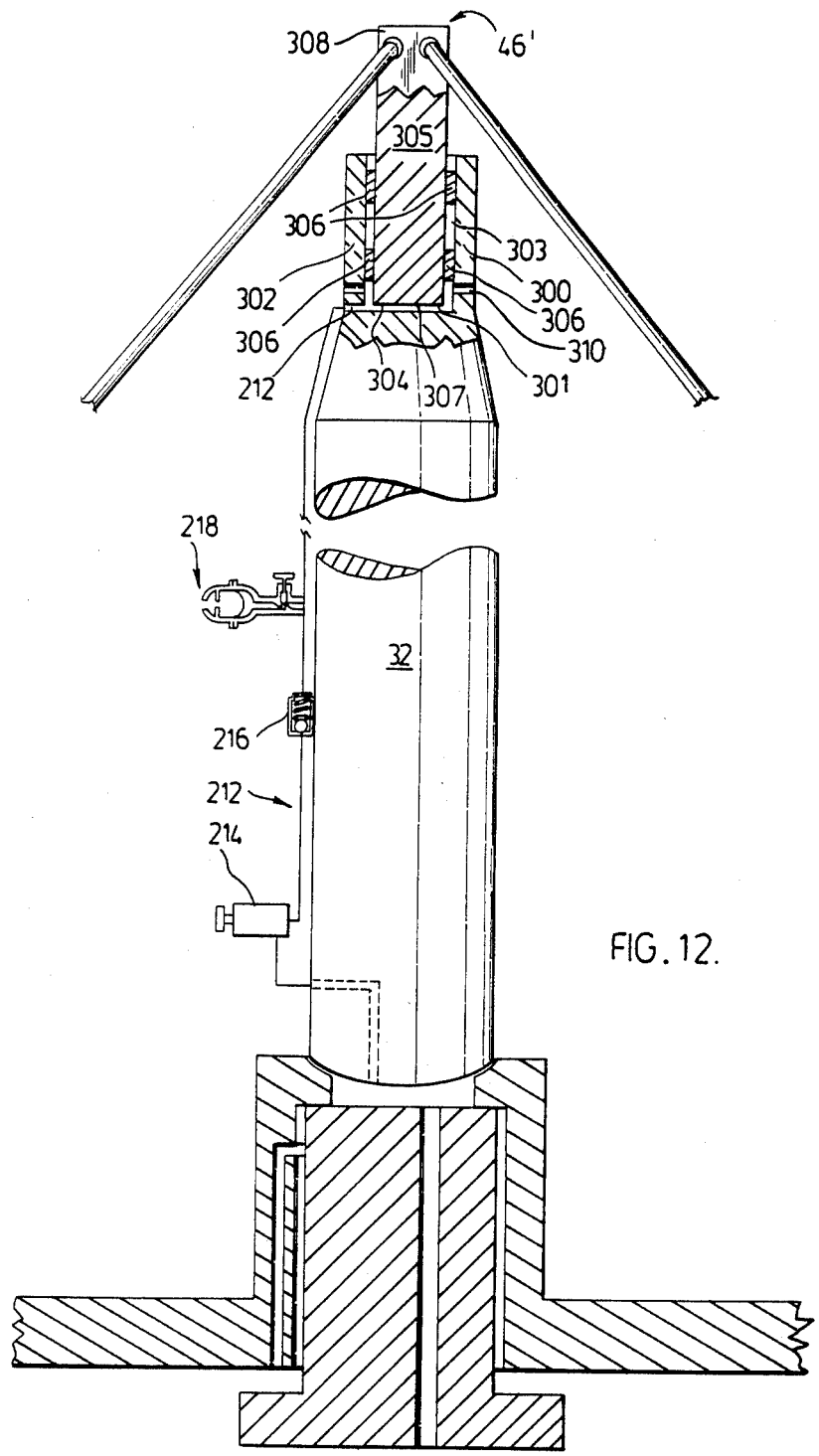
FIG. 12 is a side schematic view of part of an assembly according to a preferred embodiment of the invention.
Figure 14:
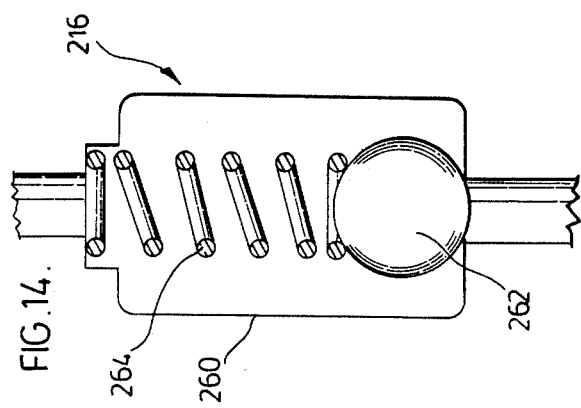
FIGS. 13A, 13B and 14 are detailed schematic side views of component parts incorporated in the assembly shown in FIGS. 11 and 12.
Figure 13B:
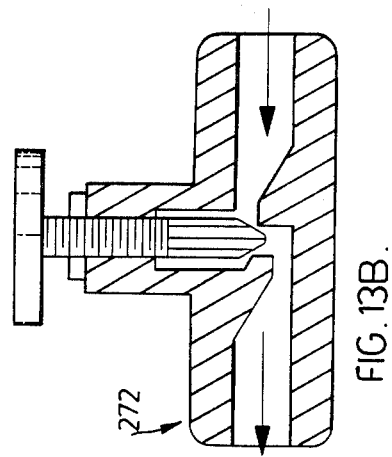
Figure 13A:
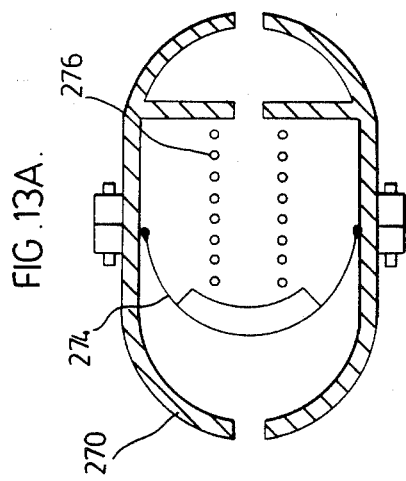
Figure 16:
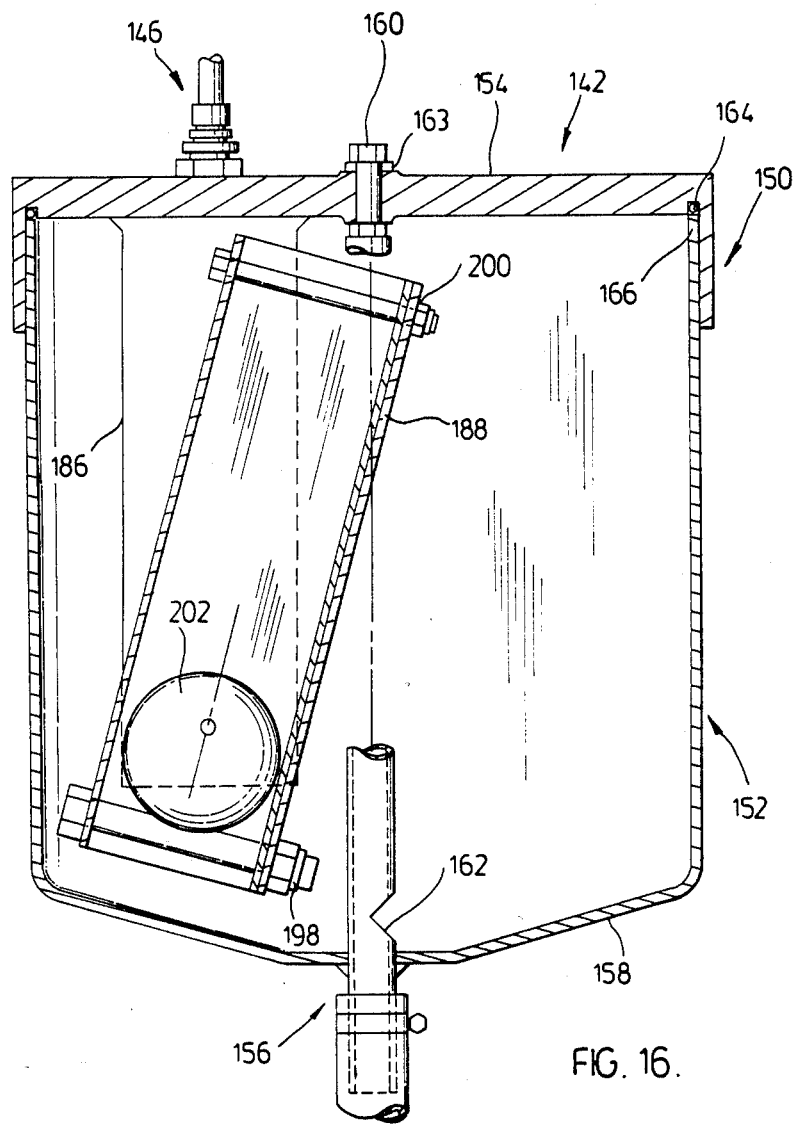
FIG. 16 is a close-up sectional view of part of the assembly shown in FIG. 9, with portions removed.

With reference to FIG. 12, upper head assembly 46¹ comprises housing 300 secured to the top of shaft 32, housing 300 comprising base 301, annular wall 302 upstanding therefrom surrounding well 303 and passageway 304 connecting passageway 212 and well 303. Mounted and sealed by annular seals 306 within well 303 for vertical displacement relative to housing 303 and seals 306 is shaft 305. Fluid fed through passageways 212 and 304 against the bottom 307 of shaft 305 elevates 305. Holes through top 308 of shaft 305 are used to secure the guy wires 38, 40, 42 and 44. Hydrodynamic bearings are also secured between the shaft 305 and inner wall of the housing 303.

Drain 310 drains fluid from controlled bearing leakage past the hydrodynamic bearings from well 303.

Fluid pumped up passageway 144 entering passageway 212 and fed to head assembly 46 or 46¹ elevates head 224 relative to shaft 220 or shaft 305 from housing 300 respsectively, thereby tensioning guy wires 38, 40, 42, and 44.

To ensure guy tension is maintained relatively constant, direct-acting pressure-reducing valve 214 (See FIG. 9) has been inserted into passageway 212 and permits only enough oil to flow therethrough to maintain fluid pressure in the head assembly at the desired pressure. To this end, valve 214 comprises housing 240, spool 242, inlet port 244, outlet port 246, pressure-sensing passage 248, compression spring 250, adjustment screw 252 extending through housing 240 and bleed passage 254.

Valve 214 is held normally open by the force exerted by spring 250 (set by set screw 252) against spool 242. As the pressure in outlet port 246 increases (sensed by passage 248) the pressure of the fluid in passage 248 on the face 256 of spool 242 compresses spring 250 when the pressure exceeds the force of the spring, moving spool 242 to close outlet port 244. When valve 214 closes completely, a small quantity of fluid drains through passageway 258 to bleed passageway 254 to reservoir 107 (not shown) preventing reduced pressure from increasing because of valve leakage. Fluid passing valve 214, passes upwardly through one-way check valve 216 comprising housing 260 holding ball 262 at the bottom under compression by compression spring 264, under greater pressure than the pressure exerted by compression spring 264 tending to seat ball 262, through passageway 222 to raise head 224 or shaft 305 a predetermined amount as limited by the guys, tensioning the guys and maintaining the tension in the guys.

When the fluid is removed from passageway 212 (as for example when bull gear 70 is braked), one way check valve 216 precludes fluid from returning past valve 216 by closing under the compression force of spring 264 thereby maintaining the pressure in head assembly 210 and the guy tension in guy wires 38, 40, 42 and 44. Additionally, the "floating" of head 46 supplies damping to the entire rotor-gear box assembly. For regulating this damping (as for example when the guys fluctuate under fluctuating loads) hydraulic damper 218 comprising air hydraulic accumulator 270 with hydraulic restrictor 272 is provided. In this case, fluid forced back through passageway 222 in instances of increased pressure through passage 212 enters restrictor 272 (See FIG. 13) creating heat (thereby acting as a damper) and then into the hydraulic accumulator 270, against diaphragm 274 held under the action of compression spring 276 (See FIG. 12). If the diaphragm is forced against the spring by the fluid, compressing the spring, the excess fluid is accumulated until the fluid pressure in assembly 46 or 46¹ eases and the diaphragm is restored to its normal position by spring 276.

FIG. 15 illustrates the tensioning of the guys employing head assembly 46 or 46¹.

As many changes could be made in the embodiments without departing from the scope of the invention, it is intended that all matter contained herein be interpreted as illustrative of the invention, and not in a limiting sense.

The embodiments of the invention in which an exclusive property or privilege is claimed are as follows:

1. An upper head assembly for the top of a wind turbine for securing the guy wires thereto, the upper head assembly comprising a guy wire coupling to which the guy wires are secured, a support for supporting the guy wire coupling, the guy wire coupling being vertically displacable relative to the support, the guy wire coupling and support presenting a housing and shaft, the shaft for being received in the housing and presenting a space therebetween for receiving fluid for vertically displacing the guy wire coupling from the support, a fluid passageway opening into the space, means for supplying fluid through the fluid passageway to elevate the coupling relative to the top of the wind turbine, sealing means for sealing the space between the shaft and housing and means to drain the fluid from the space.

2. The upper head assembly of claim 1, wherein the wind turbine is a vertical axis wind turbine, the rotor has a vertically oriented rotor shaft and the fluid passageway opens through the top of the rotor shaft and the guy wire coupling seats over the upper end of the rotor shaft.

3. The upper head assembly of claim 1, wherein the fluid passageway includes a pressure-regulating valve in the passageway to control the pressure of the fluid being fed through the passageway.

4. The upper assembly of claim 1, wherein the fluid passageway includes a one-way check valve to preclude fluid transmitted from returing via said passageway.

5. The upper head assembly of claim 1, wherein the fluid passageway includes a pressure-regulating valve and a one-way check valve between the pressure-regulating valve and the top of the wind turbine to preclude fluid transmitted from returing via said passageway.

6. The upper head assembly of claim 5, wherein a damping structure is provided between the check valve and top of the fluid passageway for dissipating energy in the system.

7. The upper head assembly of claim 6, wherein the damper comprises a restriction in a conduit.

8. The hydraulic suspension system of claim 6, wherein the damper comprises a restriction in a conduit and a hydraulic damper connected to the restriction for dissipating energy.

9. An upper head assembly for the top of a rotor of a wind turbine for securing the guy wires thereto, the upper head assembly comprising a guy wire coupling to which the guy wires are secured, and a support for supporting the guy wire coupling, the guy wire coupling and support for securing at the top of the wind turbine and presenting a space therebetween for receiving hydraulic fluid thereinto through a fluid passageway opening into the space between the support and guy wire coupling, means for supplying fluid through the fluid passageway to elevate the coupling relative to the end of the rotor shaft, sealing means for sealing the space between the guy wire coupling and support, and means to drain the fluid from the space.

10. The upper head assembly of claim 9, wherein the fluid passageway includes a pressure-regulating valve and a one-way check valve between the pressure-regulating valve and the top of the wind turbine to preclude fluid transmitted from returning via said passageway.

11. The upper head assembly of claim 10, wherein a damping structure is provided between the check valve and top of the fluid passageway for dissipating energy in the system.

12. The upper head assembly of claim 11, wherein the damper comprises a restriction in a conduit.

13. The upper head assembly of claim 11, wherein the damper comprises a restriction in a conduit and a hydraulic damper connected to the restriction for dissipating energy.

14. The upper head assembly of claim 9, wherein the wind turbine is a vertical axis wind turbine, the rotor has a vertically oriented rotor shaft and the fluid passageway opens through the top of the rotor shaft and the guy wire coupling seats over the upper end of the rotor shaft.

15. The upper head assembly of claim 9, wherein the fluid passageway includes a pressure-regulating valve in the passageway to control the Pressure of the fluid being fed through the passageway.

16. The upper head assembly of claim 9, wherein the fluid passageway includes a one-way check valve to preclude fluid transmitted from returning via said passageway.

* * * * *